(12) United States Patent
Jang et al.

(10) Patent No.: US 9,569,824 B2
(45) Date of Patent: Feb. 14, 2017

(54) DISTORTED IMAGE CORRECTION APPARATUS AND METHOD

(71) Applicant: Nextchip Co., Ltd., Seongnam-si (KR)

(72) Inventors: Won Jun Jang, Seoul (KR); Hyun Soo Kim, Seoul (KR); Ho Hyon Song, Seoul (KR)

(73) Assignee: Nextchip Co., Ltd., Seongnam-si, KG (KR)

( * ) Notice: Subject to any disclaimer, the term of this patent is extended or adjusted under 35 U.S.C. 154(b) by 0 days.

(21) Appl. No.: 14/779,585

(22) PCT Filed: Apr. 18, 2013

(86) PCT No.: PCT/KR2013/003296
§ 371 (c)(1),
(2) Date: Sep. 24, 2015

(87) PCT Pub. No.: WO2014/157765
PCT Pub. Date: Oct. 2, 2014

(65) Prior Publication Data
US 2016/0055629 A1 Feb. 25, 2016

(30) Foreign Application Priority Data
Mar. 27, 2013 (KR) .................. 10-2013-0032737

(51) Int. Cl.
*G06T 5/00* (2006.01)
*G02B 13/00* (2006.01)
(52) U.S. Cl.
CPC .......... *G06T 5/006* (2013.01); *G02B 13/0005* (2013.01); *G06T 2207/10004* (2013.01);
(Continued)

(58) Field of Classification Search
CPC .......... H04N 13/0242; H04N 5/23238; G06T 2210/44; G06T 5/006; G06T 2207/30252; G06T 3/0093; G06T 7/0018; G06T 5/002; G06T 7/0091; G02B 13/06; G02B 27/0025
See application file for complete search history.

(56) References Cited

U.S. PATENT DOCUMENTS 7,999,842 B1 *  8/2011  Barrus ................. H04N 5/2259
                                                    348/37
8,988,525 B2 *  3/2015  Thompson ............... B60R 1/00
                                                    348/148
(Continued)

FOREIGN PATENT DOCUMENTS

JP  2009-064427        3/2009
JP  2010-282295 A     12/2010
(Continued)

OTHER PUBLICATIONS

International Preliminary Report on Patentability, PCT/KR2013/003296, date of issuance Sep. 29, 2015; w/partial translation; 9 pgs.
(Continued)

*Primary Examiner* — Jingge Wu
(74) *Attorney, Agent, or Firm* — Daly, Crowley, Mofford & Durkee, LLP

(57) ABSTRACT

With regard to a distortion correction apparatus and method which are applicable to hardware for real-time distortion correction, provided are a distorted image correction apparatus and method for correcting a distortion of an image by using a non-polynomial estimation function suitable for a hardware operation, and for correcting the distortion of the image by utilizing a morphing form.

7 Claims, 12 Drawing Sheets

(52) U.S. Cl.
CPC ............ *G06T 2207/10016* (2013.01); *G06T 2207/30252* (2013.01); *G06T 2210/44* (2013.01)

(56) References Cited

U.S. PATENT DOCUMENTS

| | | | |
|---|---|---|---|
| 2002/0010384 A1* | 1/2002 | Shahidi | A61B 1/00009 600/118 |
| 2004/0012544 A1* | 1/2004 | Swaminathan | G02B 13/06 345/32 |
| 2007/0109406 A1 | 5/2007 | Schofield et al. | |
| 2012/0314021 A1 | 12/2012 | Tsang | |
| 2012/0320190 A1* | 12/2012 | Natroshvili | G06T 5/006 348/135 |
| 2014/0139676 A1* | 5/2014 | Wierich | B60R 1/00 348/148 |

FOREIGN PATENT DOCUMENTS

| | | |
|---|---|---|
| KR | 10-2008-0034720 A | 4/2008 |
| KR | 10-1053464 B1 | 8/2011 |

OTHER PUBLICATIONS

Written Opinion of the International Searching Authority, PCT/KR2013/003296, date of mailing Dec. 4, 2013; including English translation; 19 pgs.

English translation of Korean Office Action dated Mar. 26, 2014 for Korean Pat. App. No. 10-2013-0032737, 2 pages.

English translation of Search Report dated Dec. 4, 2013, for PCT/KR2013/003296, 4 pages.

\* cited by examiner

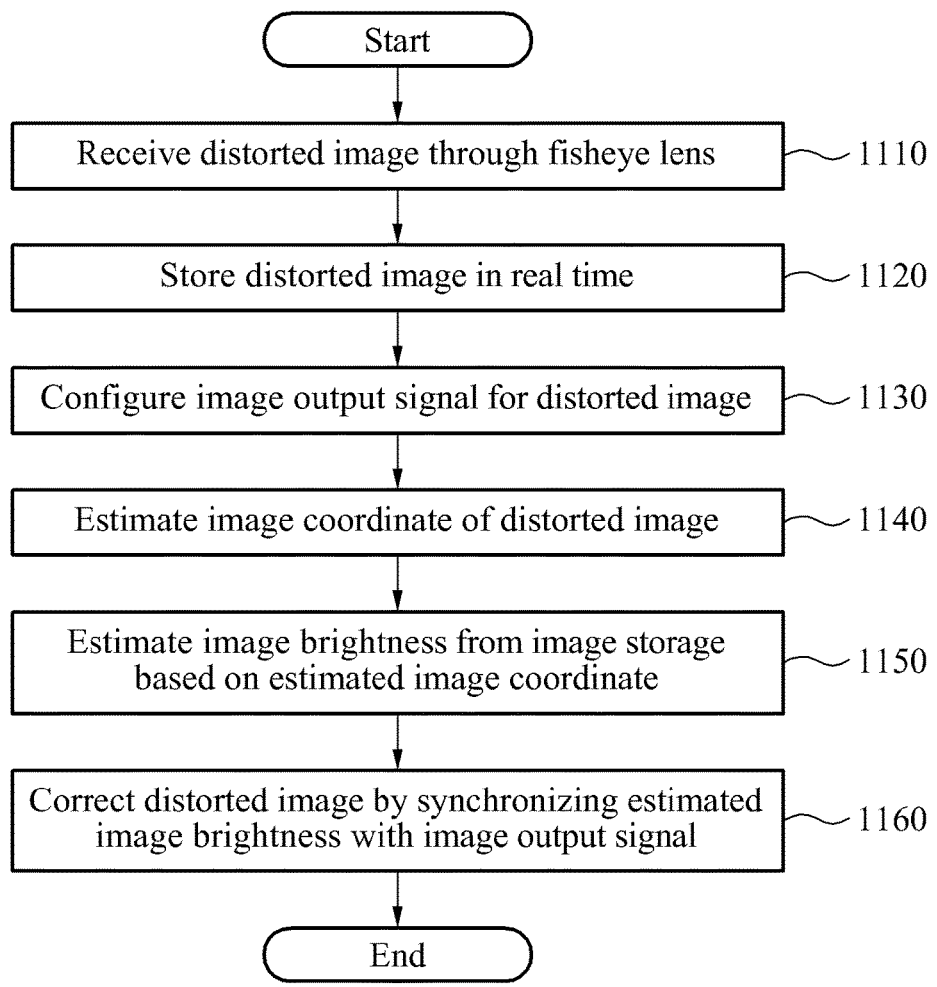

DISTORTED IMAGE CORRECTION APPARATUS AND METHOD

CROSS REFERENCE TO RELATED APPLICATIONS

This application is a U.S. National Stage of PCT application PCT/KR2013/003296 filed in the Korean language on Apr. 18, 2013, entitled "DISTORTED IMAGE CORRECTION APPARATUS AND METHOD," which claims priority to Korean application 10-2013-0032737, filed on Mar. 27, 2013, which applications are each hereby incorporated herein by reference in their entireties.

TECHNICAL FIELD

The present invention relates to an apparatus and a method for correcting a fisheye lens related distortion that uses a fewer number of distortion correction coefficients and is available for morphing.

BACKGROUND ART

In a case of generally used cameras having a small field of view, a radiative lens distortion may be mostly insignificant. However, in a case of a fisheye lens having a broad field of view, distortion related issues may occur. Since an image input through the lens may not express therein real space linearity, an issue may occur in extraction of a feature of an object from the image and recognition and classification, in addition to an issue in terms of visibility.

To solve such issues, numerous researchers have suggested distortion correcting models. The distortion correction models may be broadly classified into two models, a polynomial model and a non-polynomial model.

Although the polynomial model using several correction coefficients may be applicable to various lens distortion factors, predicting a correction coefficient for correcting a distortion may not be readily performed. Although the non-polynomial model may be a simple distortion correcting method using one or two coefficients, the non-polynomial model may not be readily applicable to a hardware operation because estimation functions such as a logarithm and a tangent are used.

In general, a vehicle is equipped with a camera configured to provide a driver with front and rear images to improve safety and convenience for the driver. Such images may provide a visual field that deviates from a visual field of the driver, and thus prevent a sudden accident. Here, a fisheye lens having a broad field of view may be used for the camera provided in the vehicle. However, as described in the foregoing, an image input through the fisheye lens may be distorted, and thus technology for correcting a distortion in real time may be needed.

A radiative distortion that may occur from an actually used fisheye lens may not be corrected using an ideally modeled non-polynomial function. Thus, in such a case, the polynomial model may be generally used to correct a distortion. However, through such a method using the polynomial model, a correction coefficient may not be readily inferred due to numerous correction coefficients, and a degree limit may occur due to an increase in an amount of calculation such as multiplication and addition when implementing an algorithm through hardware.

A distortion of an image input from a camera provided in a vehicle may be corrected based on a location of the camera, an occlusion by a vehicle bumper and a surrounding environment, and an object, for example, a front side and a rear side of the vehicle. However, since an existing algorithm and hardware module configured to correct a distortion may use several correction coefficients, infer a correction coefficient through software, and upload corresponding data, thus a distortion correcting task may not be performed in real time.

Also, in a general method of correcting a distortion, a disconnection may occur in conversion between images due to fixed correction coefficients, when expressing a corrected image in which a distortion is corrected as a plurality of images suitable to situations.

DISCLOSURE OF INVENTION

Technical Goals

An aspect of the present invention provides a method of correcting a distortion in real time using an advantage in hardware implementation through a simple control of an image radiatively distorted due to a fisheye lens.

Another aspect of the present invention provides a method of performing morphing type correction of a distortion, in addition to general type correction of a distortion.

Still another aspect of the present invention provides a method of correcting a distortion which is implemented as hardware based on an improved non-polynomial model.

Technical Solutions

According to an aspect of the present invention, there is provided an apparatus for correcting a distorted image, which is applicable to hardware for real-time distortion correction, the apparatus including a first distortion corrector configured to correct a distortion of an image using a non-polynomial estimation function suitable for a hardware operation, and a second distortion corrector configured to correct a distortion of the image using a morphing form.

According to another aspect of the present invention, there is provided an apparatus for correcting a distorted image, the apparatus including an image inputter configured to receive a distorted image through a fisheye lens, an image storage configured to store the distorted image in real time, an image configurer configured to configure an image output signal for the distorted image, a coordinate estimator configured to estimate an image coordinate of the distorted image, and an image corrector configured to estimate an image brightness from the image storage based on the estimated image coordinate and correct the distorted image by synchronizing the estimated image brightness with the image output signal.

The image corrector may correct the distorted image in a morphing form.

The apparatus may further include an image outputter configured to output the corrected image.

The apparatus may further include a correction coefficient estimator configured to estimate a correction coefficient of the distorted image.

The image corrector may include a trigonometric function detector configured to detect a trigonometric function based on the image coordinate, a first normalizer configured to estimate a first distance, which is a distance from a center of the corrected image to the image coordinate, by multiplying the image coordinate and the trigonometric function, an arctangent value detector configured to detect an arctangent value by multiplying the first distance and a focal distance of the fisheye lens, and a second normalizer configured to estimate a second distance, which is a distance from a center of the distorted image to the image coordinate, by multiplying the arctangent value and the correction coefficient.

According to still another aspect of the present invention, there is provided a method of correcting a distorted image, which is applicable to hardware for real-time correction of a distortion, the method including correcting a distortion of an image using a non-polynomial estimation function suitable for a hardware operation, and correcting a distortion of the image using a morphing form.

According to yet another aspect of the present invention, there is provided a method of correcting a distorted image, the method including receiving a distorted image through a fisheye lens, storing, in real time, the distorted image in an image storage, configuring an image output signal for the distorted image, estimating an image coordinate of the distorted image, estimating an image brightness from the image storage based on the estimated image coordinate, and correcting the distorted image by synchronizing the estimated image brightness with the image output signal.

Advantageous Effects of Invention

According to embodiments of the present invention, a distortion may be corrected in real time using an advantage in hardware implementation through a simple control of an image radiatively distorted due to a fisheye lens.

According to embodiments of the present invention, morphing type correction of a distortion may be performed in addition to general type correction of a distortion.

According to embodiments of the present invention, hardware-implemented correction of a distortion may be performed based on an improved non-polynomial model.

BRIEF DESCRIPTION OF DRAWINGS

FIG. 11 is a flowchart illustrating a detailed method of correcting a distorted image according to an embodiment of the present invention.

BEST MODE FOR CARRYING OUT INVENTION

Figure 1:
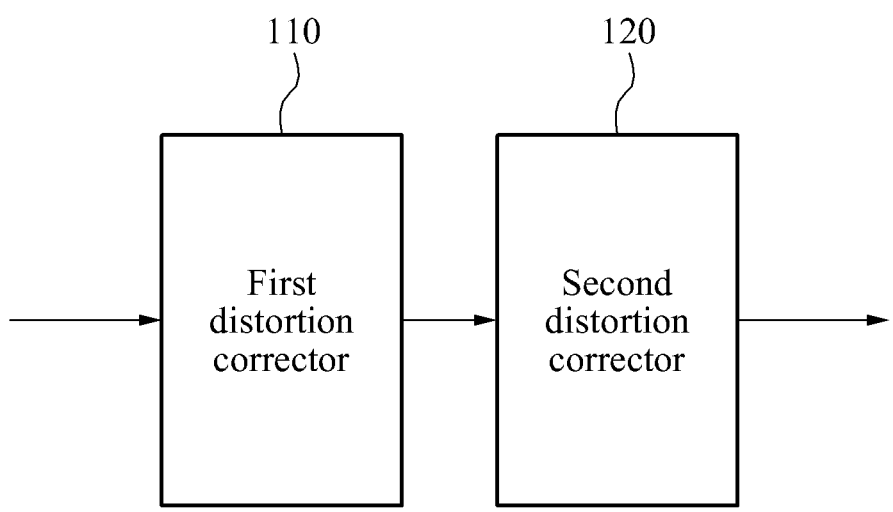
FIG. 1 is a block diagram illustrating a configuration of an apparatus for correcting a distorted image according to an embodiment of the present invention.

Hereinafter, reference will now be made in detail to examples with reference to the accompanying drawings, wherein like reference numerals refer to like elements throughout, and the examples are not construed as limited to the disclosure and should be understood to include all changes, equivalents, and replacements within the idea and the technical scope of the disclosure.

In describing embodiments, detailed description of well-known related structures or functions will be omitted when it is deemed that such description will cause ambiguous interpretation of the present disclosure. The terminology used herein is for the purpose of describing particular examples only and is not to be limiting of the examples. The meanings of the terms used herein may be variously understood based on the intentions of users and operators, or customs in the technical field to which the present disclosure belongs. Thus, the terms used herein may be defined based on the overall description of the present disclosure.

According to embodiments, an apparatus for correcting a distorted image, hereinafter simply referred to as a distorted image correcting apparatus, may provide hardware resources and structure optimized to correct a distortion.

FIG. 1 is a block diagram illustrating a configuration of a distorted image correcting apparatus according to an embodiment of the present invention.

Referring to FIG. 1, the distorted image correcting apparatus is applicable to hardware to correct a distortion in real time, and includes a first distortion corrector 110 and a second distortion corrector 120.

The first distortion corrector 110 corrects a distortion of an image using a non-polynomial estimation function suitable for a hardware operation, and for example, corrects the distortion using a finite estimation function having a high accuracy.

The second distortion corrector 120 corrects a distortion of an image using a morphing form, and for example, corrects the distortion by sequentially changing a correction coefficient from an initially set distortion correction coefficient to a finally set distortion correction coefficient.

The configuration of the distorted image correcting apparatus will be described in detail hereinafter.

Figure 2:
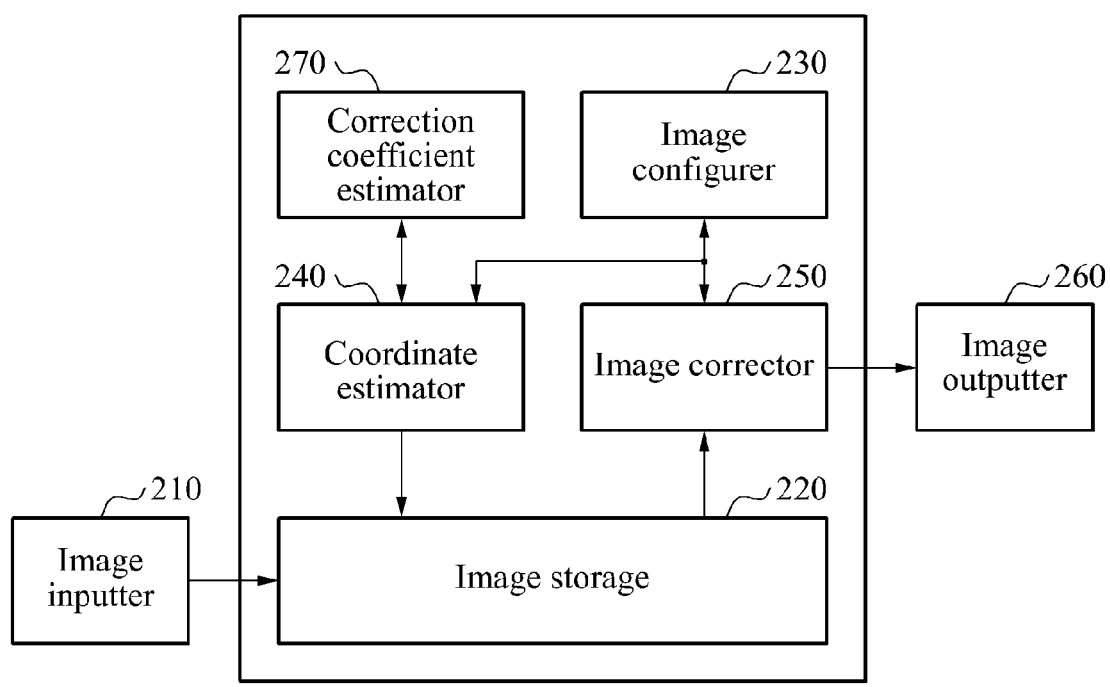
FIG. 2 is a block diagram illustrating a detailed configuration of an apparatus for correcting a distorted image according to an embodiment of the present invention.

FIG. 2 is a block diagram illustrating a detailed configuration of a distorted image correcting apparatus according to an embodiment of the present invention.

Referring to FIG. 2, the distorted image correcting apparatus includes an image inputter 210, an image storage 220, an image configurer 230, a coordinate estimator 240, and an image corrector 250.

The image inputter 210 receives a distorted image through a fisheye lens, and the image storage 220 stores, in real time, the distorted image.

The image configurer 230 configures an image output signal for the distorted image, and the coordinate estimator 240 estimates an image coordinate of the distorted image.

The image corrector 250 estimates an image brightness from the image storage 220 based on the estimated image coordinate, and corrects the distorted image by synchronizing the estimated image brightness with the image output signal.

The distorted image correcting apparatus may correct the distorted image in a morphing form using the image corrector 250.

The distorted image correcting apparatus further includes an image outputter 260. The image outputter 260 outputs the corrected image in which a distortion is corrected.

In addition, the distorted image correcting apparatus further includes a correction coefficient estimator 270. The correction efficient estimator 270 estimates a correction coefficient to correct the distorted image.

The distorted image correcting apparatus may correct the distorted image using various types of algorithms and, for example, may correct the distorted image based on a field-of-view (FOV) model of non-polynomial models.

The coordinate estimator 240 estimates the image coordinate based on Equation 1.

$$r_d = \frac{1}{\omega}\arctan\left(2r_u\tan\frac{\omega}{2}\right) \quad \text{[Equation 1]}$$

In Equation 1, "$r_u$" denotes a distance from a center of the corrected image to the image coordinate, and "$r_d$" denotes a distance from a center of the distorted image to the image coordinate. "$\omega$" corresponds to a field of view of a camera equipped with the fisheye lens.

Figure 3:
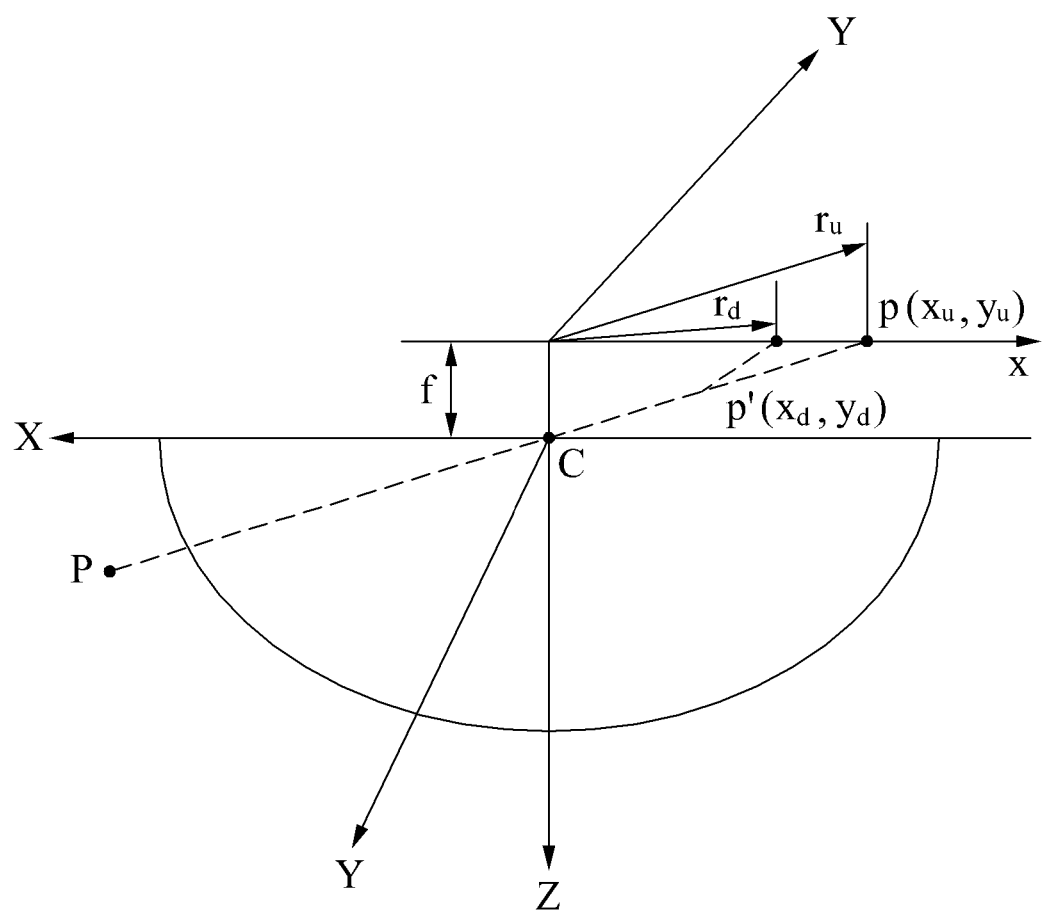
FIG. 3 is a diagram illustrating an optical model of a fisheye lens according to an embodiment of the present invention.

FIG. 3 is a diagram illustrating an optical model of a fisheye lens according to an embodiment of the present invention.

Referring to FIG. 3, a point P present in a spatial coordinate system corresponds to a point p present in an image coordinate system by passing through a center C of a general lens. Here, "f" denotes a focal distance, and "X," "Y," and "Z" correspond to the three-dimensional (3D) spatial coordinate system, and "x" and "y" correspond to the image coordinate system. In a case of the fisheye lens, the point P may be distorted to correspond to a point p'.

According to an embodiment, to obtain a corrected image in which a distortion is corrected, an image brightness value of the point P present in the spatial coordinate system may need to be obtained. Thus, a location of the point p' may be estimated based on a distortion model and a brightness value of a distorted image present at the estimated location of the point p' may be obtained.

Referring back to FIG. 2, the coordinate estimator 240 estimates an image coordinate based on Equation 2.

$$r_d = \alpha \times \arctan(r_u \times f) \quad \text{[Equation 2]}$$

In Equation 2, "f" denotes the focal distance of the fisheye lens, and "$\alpha$" corresponds to a degree of correction of the distorted image.

When $r_u$, which is a distance from a center of the corrected image to the point p, for example, $p(x_u, y_u)$, is expressed as Equation 2, the distorted image correcting apparatus may estimate a distorted image coordinate, for example, $p'(x_d, y_d)$, present from the center by a distance $r_d$.

The distorted image correcting apparatus may obtain the image coordinate of the distorted image using Equation 3.

$$r_u = x_u \times \cos\theta + y_u \times \sin\theta \quad \text{[Equation 3]}$$

$$r'_u = \frac{r_u}{r_{max}}$$

$$\phi = f \times r'_u$$

-continued $$r'_d = \alpha \times \arctan(\phi)$$

$$r_d = r'_d \times r_{max}$$

$$x_d = r_d \times \cos\theta, \quad y_d = r_d \times \sin\theta$$

In Equation 3, "$r_{max}$" corresponds to a value of a longest distance from a center of an image, and "$\alpha$" and "f" may be used to enable distortion correction in response to various angles of view with a fewer number of correction coefficients. The distorted image correcting apparatus may adjust a degree of correction of a distorted image by adjusting $\alpha$, and adjust a focal distance of a fisheye lens by adjusting f.

When the distorted image correcting apparatus is configured as hardware, the distorted image correcting apparatus may be implemented as a trigonometric function and an arctangent function. For example, the distorted image correcting apparatus may suitably determine a degree of truncation of a valid decimal point for each angle in a range between 0° and 360°.

According to an embodiment, greater truncation based on a minimum quantity of resources may result in a lower linearity between the estimated coordinate values, for example, $p'(x_d, y_d)$. Further, when performing image interpolation using coordinates with such a lower linearity, an image brightness may be expressed in a block unit, and thus a degradation of an image quality may occur. Thus, the trigonometric function and the arctangent function may be used based on an accuracy of a function and a usage of hardware resources.

According to an embodiment, the distorted image correcting apparatus may estimate a brightness of a distorted image using an image coordinate and correct the distorted image using the estimated brightness.

A method of estimating an image coordinate will be described hereinafter. Although variables and values are assumed to facilitate the description, the description may not be limited to the variables and the values.

Since a distortion factor of an image for which an image coordinate is to be obtained is consistent in a radiative direction, distortion factors at a location from a center of the image by a distance r may be assumed to be the same. Since a distortion factor in a first quadrant is equal to a distortion factor in another quadrant, for example, a second quadrant, a third quadrant, and a fourth quadrant, thus a distorted coordinate value may be estimated based on the distance r estimated in the first quadrant. Thus, a range of the trigonometric function and the arctangent function may be limited to be between 0° and 90°.

According to an embodiment, for effective utilization of hardware resources, the trigonometric function within the range between 0° and 90° may not be infinitely expressed, and thus the trigonometric function may be expressed as two types. The trigonometric function may be expressed as a trigonometric function value in an outer pixel of an image, and as a 4-linearity.

Figure 4A:
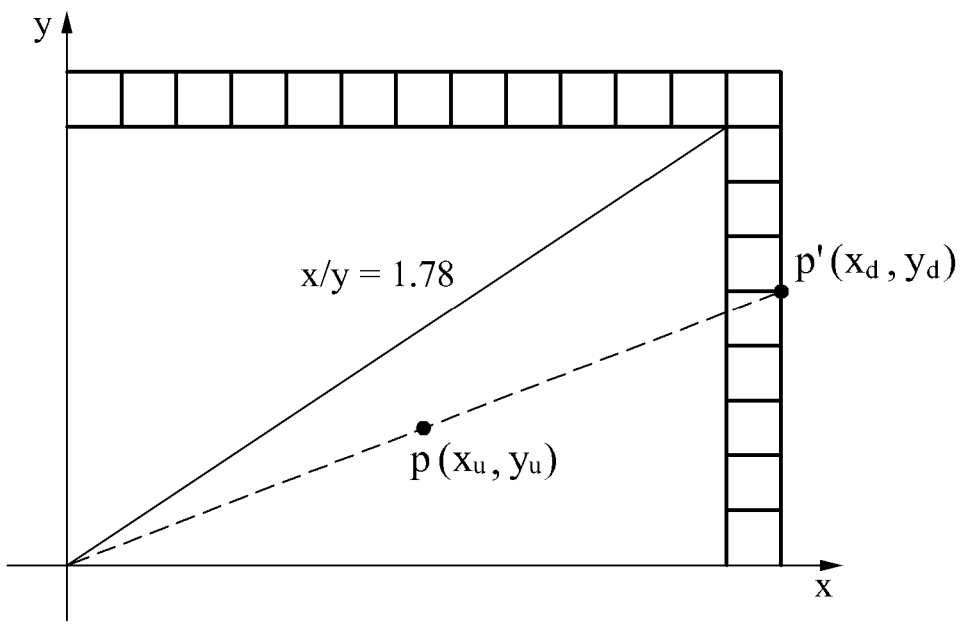
FIG. 4A is a diagram illustrating an example of a first quadrant of a distorted image according to an embodiment of the present invention.
Figure 4B:
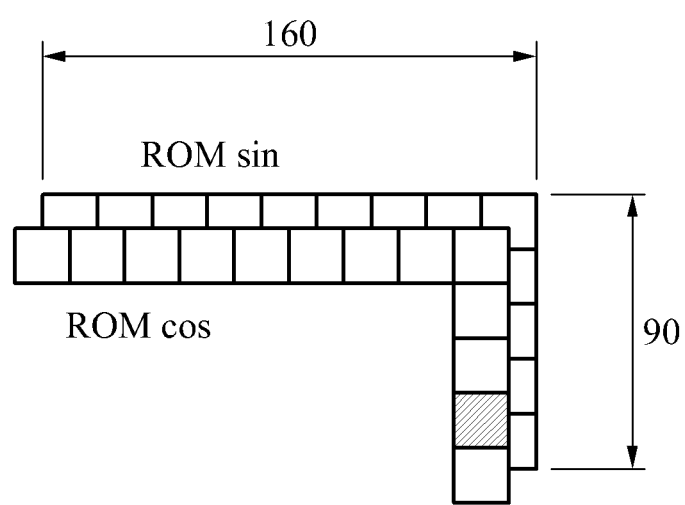
FIG. 4B is a diagram illustrating a relationship between a first quadrant of a distorted image and a trigonometric function read-only memory (ROM) table according to an embodiment of the present invention.

FIG. 4A is a diagram illustrating an example of a first quadrant of a distorted image according to an embodiment of the present invention. FIG. 4B is a diagram illustrating a relationship between a first quadrant of a distorted image and a trigonometric function read-only memory (ROM) table according to an embodiment of the present invention.

Since all straight lines passing a center of an image pass an outer pixel of the image, an angle at a point $p(x_u, y_u)$ may be equal to an angle at a point $p'(x_d, y_d)$ as illustrated in FIG. 4A. Thus, only with a trigonometric function value in the outer pixel, a distorted image correcting apparatus may perform a trigonometric function operation needed for correcting a distortion.

Referring to FIG. 4B, a number of trigonometric functions in the outer pixel may be identical to a size of the image, which may be a burden to a quantity of hardware resources. Thus, a trigonometric function value to be expressed in four pixels may be assumed to have continuity, and a ROM table may be configured only with a trigonometric function value in each four pixels.

For example, an arctangent may be configured as a ROM table by dividing a value in a range between 0 and $\pi$ into empirically defined 7,200 values, and a valid decimal point position of a value of each function may be configured up to 20 bits.

Figure 5:
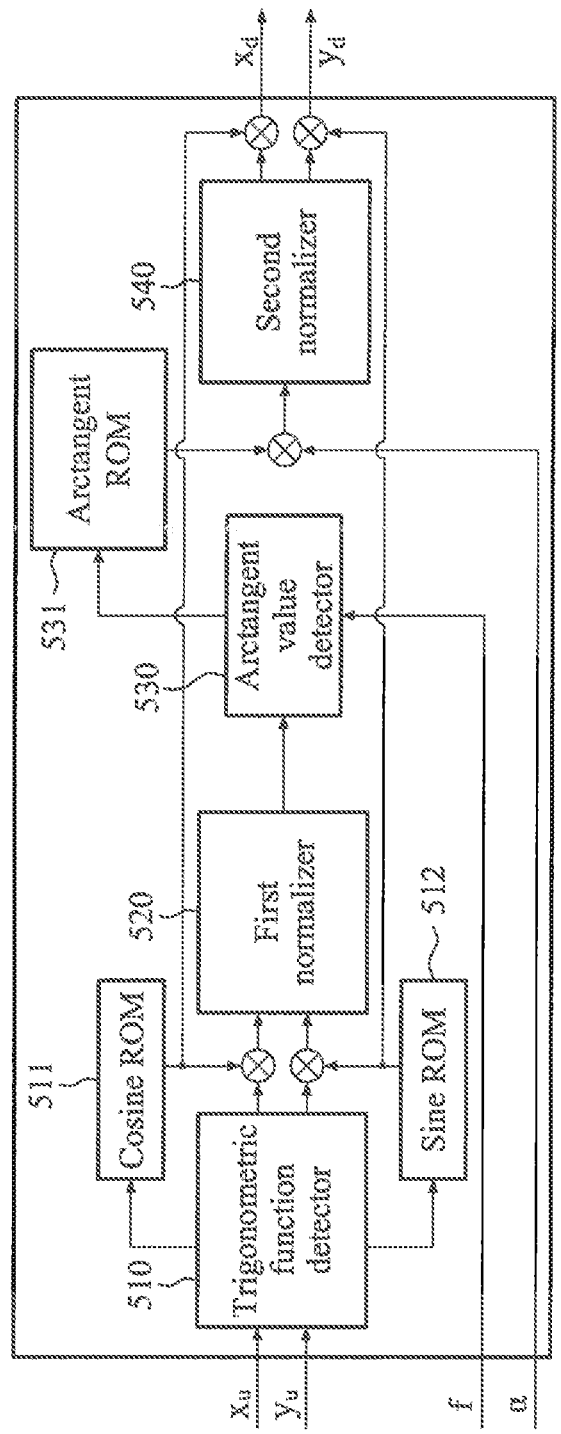
FIG. 5 is a diagram illustrating a configuration of an image corrector according to an embodiment of the present invention.

FIG. 5 is a diagram illustrating a configuration of an image corrector according to an embodiment of the present invention.

Referring to FIGS. 2 and 5, the image corrector 250 includes a trigonometric function detector 510, a first normalizer 520, an arctangent value detector 530, and a second normalizer 530, and corrects a distorted image based on a configured trigonometric function and an arctangent function.

The trigonometric function detector 510 detects a trigonometric function based on an image coordinate. The first normalizer 520 estimates a first distance, which is a distance from a center of a corrected image in which a distortion is corrected to the image coordinate by multiplying the image coordinate and the trigonometric function.

For example, the trigonometric function detector 510 may receive, as an input, a coordinate $(x_u, y_u)$ for which a distortion is to be corrected in real time in accordance with a memory clock, and detect a trigonometric function suitable for the input coordinate. The first normalizer 520 may estimate a distance $r_u$ through the multiplication using the detected trigonometric function. Here, a cosine ROM 511 and a sine ROM 512 store or extract a value of the trigonometric function to estimate the distance $r_u$.

The arctangent value detector 530 detects an arctangent value by multiplying the first distance and a focal distance of a fisheye lens. For example, the arctangent value detector 530 may obtain the arctangent value through the multiplication of the estimated distance $r_u$ and the focal distance. Here, an arctangent ROM 531 stores and provides the arctangent value.

The second normalizer 540 estimates a second distance, which is a distance from a center of a distorted image to the image coordinate, by multiplying the arctangent value and a distortion correction coefficient. For example, the second normalizer 540 may obtain the arctangent value through the multiplication of the estimated distance $r_u$ and the focal distance, and finally estimate a $r_d$ using the distortion correction coefficient.

According to an embodiment, the estimated $r_d$ may be used to obtain a distorted image coordinate $(x_d, y_d)$ from the obtained trigonometric function value. The distorted image coordinate may be used to refer to a brightness of the distorted image stored in a memory. In addition, the corrected image may be extracted by outputting, suitably for an output image signal, a brightness value obtained using interpolation.

According to an embodiment, an operation of obtaining a distorted image coordinate may be formed in a pipeline structure. Thus, an operation of correcting a distortion may be performed in real time with a presence of only a slight latency and without a delay in the operation.

The operation of obtaining an image coordinate of a distorted image will be described with an example to be provided hereinafter.

The distorted image correcting apparatus may compare inclination values using an equation between straight lines passing a point $(x_u, y_u)$ from an image center, for example, $$\frac{y}{x} = \frac{640}{360} = 1.78$$

in a case of a 1280×720 image.

When an inclination value is small, the distorted image correcting apparatus may extract a y value by applying 640 to an x value in Equation 4. When the inclination value is large, the distorted image correcting apparatus may extract an x value by applying 360 to a y value.

$$y = \frac{y_u}{x_u} \times x \qquad \text{[Equation 4]}$$

In Equation 4, when the extracted value is $\beta$, the distorted image correcting apparatus may read stored data using a value of $$\frac{\beta}{4}$$

as an address of a trigonometric function ROM table which has a 4-linearity. The data of the ROM table may be used to extract a final trigonometric function value through linear interpolation.

The distorted image correcting apparatus may estimate the $r_u$ using the extracted trigonometric function value. The estimated $r_u$ may be used to estimate the $r_d$ using the distortion correction coefficient, the arctangent ROM table, and the focal distance. The distorted image correcting apparatus may obtain the coordinate $(x_d, y_d)$ of the distorted image using the estimated $r_d$ and the obtained trigonometric function value.

Figure 6:
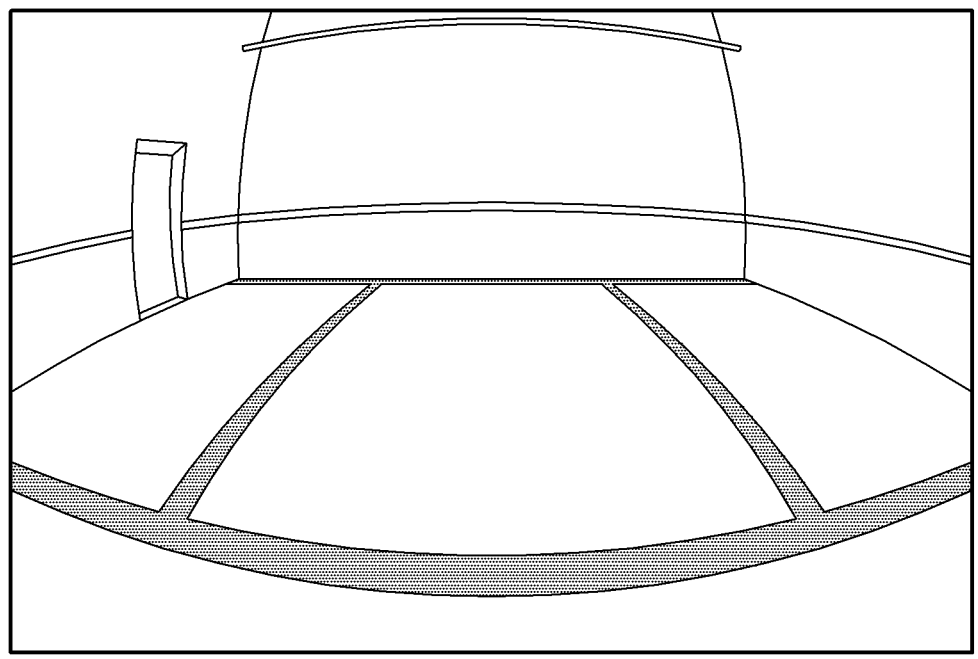
FIG. 6 illustrates an example of a distorted image according to an embodiment of the present invention.
Figure 7:
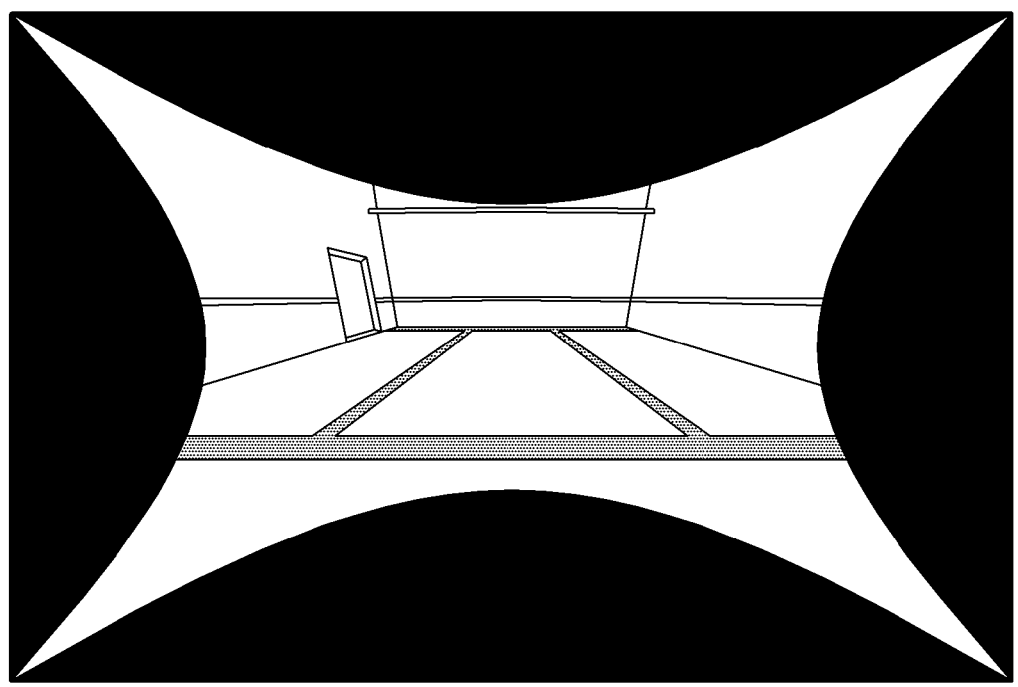
FIG. 7 illustrates an example of a corrected image in which a distortion is corrected using a distortion correction coefficient according to an embodiment of the present invention.

FIG. 6 illustrates an example of a distorted image according to an embodiment of the present invention, and FIG. 7 illustrates an example of a corrected image in which a distortion is corrected using a distortion correction coefficient according to an embodiment of the present invention.

According to an embodiment, a distorted image correcting apparatus may perform morphing type correction, in addition to distortion correction, to provide another form of an application. The distorted image correcting apparatus may perform morphing to final distortion correction through adjustment of a focal distance coefficient.

The distorted image correcting apparatus may correct a distortion of a distorted image illustrated in FIG. 6 by extending the distorted image in diagonal directions as illustrated in FIG. 7. The distorted image correcting apparatus may adjust a size of the distorted image to be suitable for a size of an image to be output using the focal distance coefficient. To suitably adjust the size, a portion in which image data does not exist may not be expressed.

Figure 8:
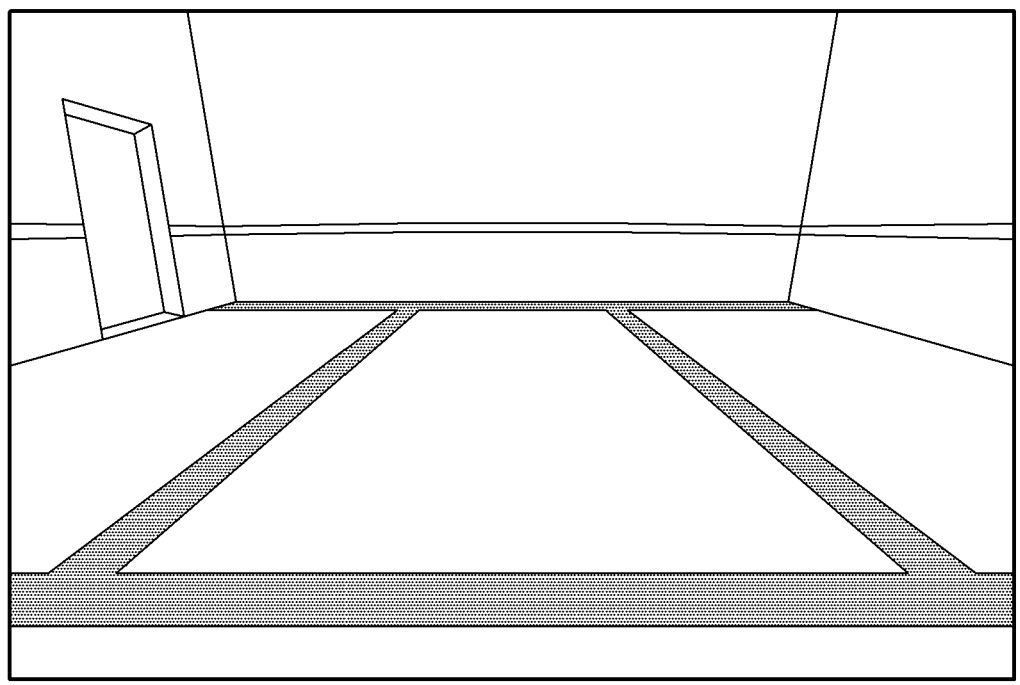
FIG. 8 illustrates an example of a corrected image in which a distortion is corrected using a distortion correction coefficient and a focal distance coefficient according to an embodiment of the present invention.

FIG. 8 illustrates an example of a corrected image in which a distortion is corrected using a distortion correction coefficient and a focal distance coefficient according to an embodiment of the present invention.

As illustrated in FIG. 8, to express only a corrected image in which a distortion is corrected, correction may be performed to allow image data to be present at a last pixel location in a height direction from an image center.

To allow distorted image data to be present at the last pixel location in the height direction from the image center, a distorted image correcting apparatus may perform an operation to allow a value of a distance $r_d$ of a distorted coordinate system to be a value of a height of the image/2 in a portion in which a distance $r_u$ from a corrected coordinate system to the image center corresponds to the height of the image/2.

When a user sets a distortion correction coefficient, the distorted image correcting apparatus may perform morphing through the following operations.

In operation 1, the distorted image correcting apparatus multiplies $r_u$, which is a height of an image/2, and an initially set if corresponding to, for example, 0.5625, by referring to Equation 3. In operation 2, the distorted image correcting apparatus extracts data by applying the obtained value to an arctangent ROM table.

In operation 3, when the extracted value is k, the distorted image correcting apparatus expresses "$r_d=\alpha*k$" and infers a value of a by applying the height of the image/2 to $r_d$.

In operation 4, the distorted image correcting apparatus applies the inferred value of a and f to convert the image to a first corrected image. The distorted image correcting apparatus repetitively performs operations 1 through 4 until the value of α to be identical to a final correction coefficient.

According to an embodiment, when converting the corrected image to the original image, the distorted image correcting apparatus may repetitively perform the forgoing operations while reducing the value of f, and perform the morphing type distortion correction when a distortion correction coefficient and a focal point coefficient needed for the morphing are obtained for each frame based on an output image.

FIGS. 9A through 9D illustrate an example of progression of morphing type distortion correction as a value of "f" changes according to an embodiment of the present invention.

Figure 9A:
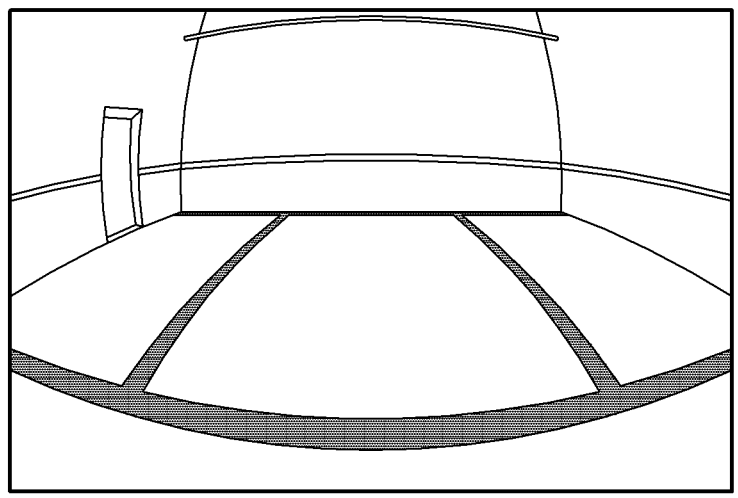
FIGS. 9A through 9D illustrate an example of progression of morphing type distortion correction as a value of "f" changes according to an embodiment of the present invention.
Figure 9B:
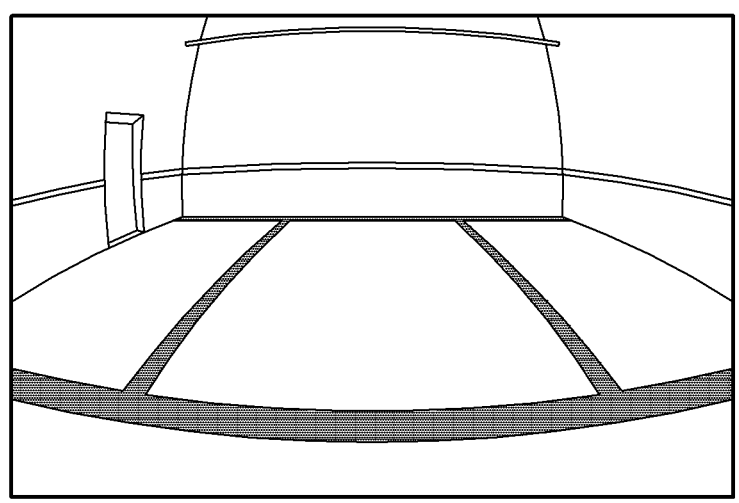
Figure 9C:
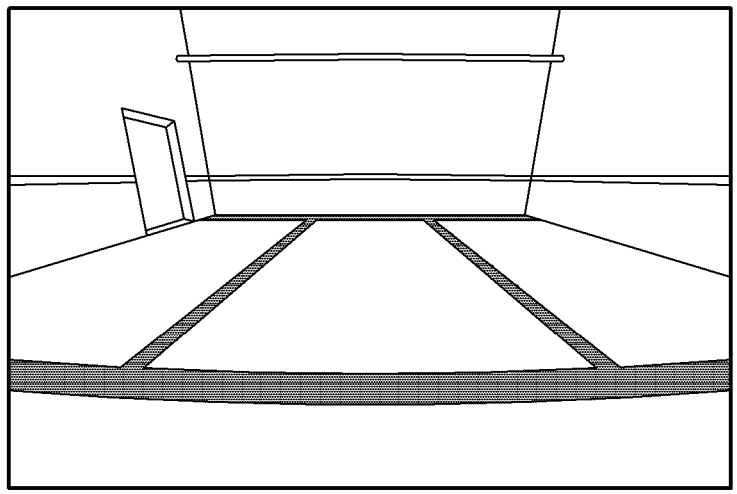
Figure 9D:
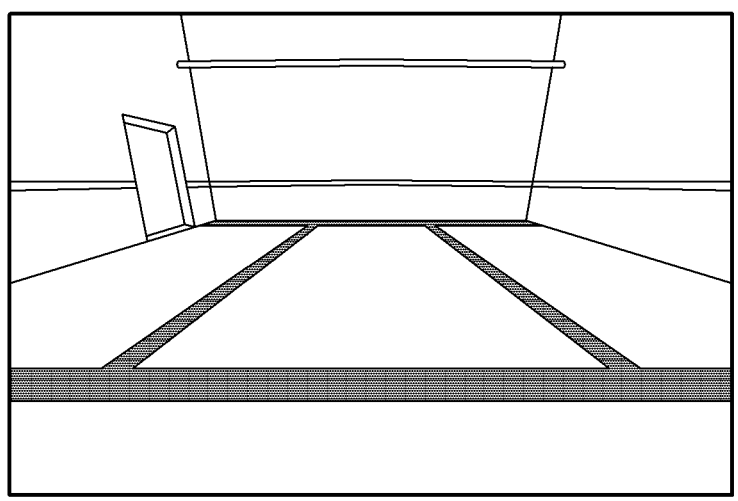

A distorted image correcting apparatus may sequentially morph a distorted image illustrated in FIG. 9A to images illustrated in FIGS. 9B through 9D, while gradually changing the value of f, in order to obtain a completely corrected image illustrated in FIG. 9D.

Hereinafter, a method of correcting a distorted image will be described.

Figure 10:
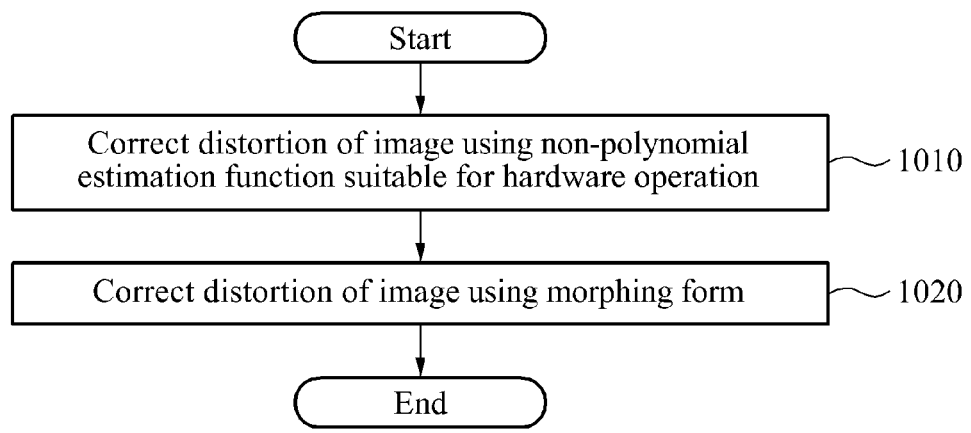
FIG. 10 is a flowchart illustrating a method of correcting a distorted image according to an embodiment of the present invention.

FIG. 10 is a flowchart illustrating a method of correcting a distorted image according to an embodiment of the present invention.

Referring to FIG. 10, in operation 1010, a distorted image correcting apparatus performs a distorted image correcting method which is applicable to hardware to perform real-time distortion correction, and corrects a distortion of an image using a non-polynomial estimation function suitable for a hardware operation. In operation 1020, the distorted image correcting apparatus corrects a distortion of the image using a morphing form.

The distorted image correcting apparatus may correct a distortion of an image using a finite estimation function having a high accuracy, and correct the distortion of the image by sequentially changing a distortion correction coefficient from an initially set distortion correction coefficient to a finally set distortion correction coefficient.

FIG. 11 is a flowchart illustrating a detailed method of correcting a distorted image according to an embodiment of the present invention.

Referring to FIG. 11, in operation 1110, a distorted image correcting apparatus receives, as an input, a distorted image through a fisheye lens. In operation 1120, the distorted image correcting apparatus stores the distorted image in real time.

In operation 1130, the distorted image correcting apparatus configures an image output signal for the distorted image. In operation 1140, the distorted image correcting apparatus estimates an image coordinate of the distorted image.

In operation 1150, the distorted image correcting apparatus estimates an image brightness from an image storage based on the estimated image coordinate. In operation 1160, the distorted image correcting apparatus corrects the distorted image by synchronizing the estimated image brightness with the image output signal.

According to an embodiment, a method of correcting a distorted image may perform real-time distortion correction using an advantage of hardware implementation through a simple control of an image radiatively distorted due to a fisheye lens. In addition, the method of correcting a distorted image may perform distortion correction in a morphing form, in addition to a general form.

According to an embodiment, a method of correcting a distorted image may perform distortion correction configured as hardware based on an improved non-polynomial model.

According to an embodiment, a method of correcting a distorted image may perform distortion correction using several distortion correction coefficients, and perform an operation of an estimation function suitable for a hardware structure. In addition, to solve an issue that may occur when converting a distorted image to a corrected image suitable for a certain situation, the method may perform the distortion correction in a morphing form.

The method described herein according to embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. An apparatus for correcting a distorted image, which is applicable to hardware for real-time distortion correction, the apparatus comprising:
at least one processor; and
a memory having instructions stored thereon executed by the at least one processor to perform;
receiving a distorted image through a fisheye lens;
configuring an image output signal for the distorted image;
estimating an image coordinate of a corrected image based on the distorted image;
estimating an image brightness of the distorted image based on the estimated image coordinated;
correcting the distorted image by synchronizing the estimated image brightness with the image output signal; and
performing morphing to final distortion correction through adjustment of a focal distance coefficient to generate a final corrected image.

2. The apparatus of claim 1, wherein the estimating the image coordinate estimates the image coordinate based on Equation 1, $$r_d = \alpha \times \arctan(r_u \times f) \qquad \text{[Equation 1]}$$

wherein "$r_u$" denotes a distance from a center of the corrected image to the image coordinate, "$r_d$" denotes a distance from a center of the distorted image to the image coordinate, "f" denotes a focal distance of the fisheye lens, and "$\alpha$" corresponds to each degree of correction of the distorted image.

3. The apparatus of claim 1, wherein the performing morphing comprises correcting the corrected image by sequentially changing a distortion correction coefficient from an initially set distortion correction coefficient to a finally set distortion correction coefficient.

4. A method of correcting a distorted image, which is applicable to hardware for real-time correction of a distortion, the method comprising:
receiving a distorted image through a fisheye lens;
configuring an image output signal for the distorted image;
estimating an image coordinate of a corrected image based on the distorted image;
estimating an image brightness of the distorted image based on the estimated image coordinate;
correcting the distorted image by synchronizing the estimated image brightness with the image output signal, and
performing morphing to final distortion correction through adjustment of a focal distance coefficient to generate a final corrected image.

5. The method of claim 4, wherein the estimating the image coordinate estimates the image coordinate based on Equation 2, $$r_d = \alpha \times \arctan(r_u \times f) \qquad \text{[Equation 2]}$$

wherein "$r_u$" denotes a distance from a center of the corrected image to the image coordinate, "$r_d$" denotes a distance from a center of the distorted image to the image coordinate, "f" denotes a focal distance of the fisheye lens, and "$\alpha$" corresponds to each degree of correction of the distorted image.

6. The method of claim 4, wherein the correcting the distorted image comprises:
detecting a trigonometric function based on the image coordinate;
estimating a first distance, which is a distance from a center of the corrected image to the image coordinate by multiplying the image coordinate and the trigonometric function;
detecting an arctangent value by multiplying the first distance and a focal distance of the fisheye lens; and
estimating a second distance, which is a distance from a center of the distorted image to the image coordinate, by multiplying the arctangent value and the correction coefficient.

7. A non-transitory computer-readable storage medium storing a program for causing a processor to perform the method of claim 4.

* * * * *